(12) United States Patent
Korngut et al.

(10) Patent No.: US 11,250,560 B2
(45) Date of Patent: Feb. 15, 2022

(54) METHODS AND SYSTEMS FOR EXPEDITING MULTI-PERSPECTIVE WAFER ANALYSIS

(71) Applicant: Applied Materials Israel Ltd., Rehovot (IL)

(72) Inventors: Doron Korngut, Modiin (IL); Ido Almog, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 33 days.

(21) Appl. No.: 16/923,882

(22) Filed: Jul. 8, 2020

(65) Prior Publication Data

US 2022/0012862 A1 Jan. 13, 2022

(51) Int. Cl.
*G06K 9/32* (2006.01)
*G06T 7/00* (2017.01)
*G06T 7/62* (2017.01)

(52) U.S. Cl.
CPC .............. *G06T 7/001* (2013.01); *G06T 7/62* (2017.01); *G06T 2207/10152* (2013.01); *G06T 2207/30148* (2013.01)

(58) Field of Classification Search
CPC ... G01R 31/2644; H01L 21/78; H01L 23/544; H01L 21/02013; H04R 7/16; B28D 5/045; B24B 37/04; G06K 9/32; G06F 12/0215; G06F 3/0679; G11C 16/26
See application file for complete search history.

(56) References Cited

U.S. PATENT DOCUMENTS

2007/0288219 A1* 12/2007 Zafar .................... G06T 7/0008 703/14
2008/0307908 A1* 12/2008 Shomrony ......... G01N 21/9501 73/865.8

* cited by examiner

Primary Examiner — Phuoc H Doan
(74) Attorney, Agent, or Firm — Kilpatrick Townsend & Stockton LLP

(57) ABSTRACT

Disclosed herein is method for multi-perspective-based wafer analysis. The method includes (i) scanning a plurality of pages, or portions thereof, one after the other, wherein each page, or a portion thereof, is successively scanned, in each of a multiplicity of perspectives, and (ii) analyzing scan data of a last scanned page while scanning a next page from the plurality of pages. At least some of the pages include multiple slices of the wafer. The analysis of the scan data includes identifying defects in the scanned pages, based on an integrated analysis combining scan data from each of the multiplicity of perspectives. Further disclosed is a computerized system configured to implement the method.

15 Claims, 9 Drawing Sheets

```
┌─────────────────────────────────────────────────────────────┐
│ Performing preliminary analysis of scan data of a last scanned │
│ page to identify "candidate" sub-areas (e.g. pixels) that   │
│ potentially include, or partially include, defects. Sub-operations │
│ 510 to 540 are next implemented only with respect to the    │
│ candidate sub-areas.                                         │
└─────────────────────────────────────────────────────────────┘
                              ⌐── 505
                              ▼
┌─────────────────────────────────────────────────────────────┐
│ For each of a plurality of scanned areas in a last scanned page, │
│ and for each of a plurality of sub-areas of the scanned area, │
│ computing a respective first set of sub-area values based on │
│ corresponding scan data in each of the perspectives.         │
└─────────────────────────────────────────────────────────────┘
                              ⌐── 510
                              ▼
┌─────────────────────────────────────────────────────────────┐
│ For each of the sub-areas, computing a respective reference set │
│ of sub-area values, based on corresponding reference scan data │
│ in each of the perspectives.                                 │
└─────────────────────────────────────────────────────────────┘
                              ⌐── 520
                              ▼
┌─────────────────────────────────────────────────────────────┐
│ For each of the sub-areas, generating a respective set of   │
│ difference values, based on the computed first set of sub-area │
│ values and the reference set of sub-area values.            │
└─────────────────────────────────────────────────────────────┘
                              ⌐── 530
                              ▼
┌─────────────────────────────────────────────────────────────┐
│ For each of the sub-areas, determining whether the sub-area │
│ includes a defect or a part of a defect, based at least on the │
│ respective set of difference values and a respective set of noise │
│ values.                                                      │
└─────────────────────────────────────────────────────────────┘
                              ⌐── 540
```

500       Fig. 5

METHODS AND SYSTEMS FOR EXPEDITING MULTI-PERSPECTIVE WAFER ANALYSIS

TECHNICAL FIELD

The present disclosure relates generally to wafer analysis.

BACKGROUND

As design rules shrink, wafer inspection tools are accordingly required to detect increasingly smaller defects. Previously, defect detection was mainly limited by laser power and detector noise. Currently, state-of-the-art wafer inspection tools are mostly limited by wafer noise due to diffuse reflection from the surface of the wafer: Surface irregularities on the wafer, constituted by the roughness of the etched patterns, are often manifested as bright spots (speckles) in a scanned image. These bright spots may highly resemble the "thumbprint" of a defect. There is thus a need for improved techniques of distinguishing defects from wafer noise.

SUMMARY

Aspects of the disclosure, according to some embodiments thereof, relate to multi-perspective wafer analysis (i.e. wafer analysis based on scan data from multiple perspectives). More specifically, but not exclusively, aspects of the disclosure, according to some embodiments thereof, relate to systems and methods for expediting multi-perspective wafer analysis.

Thus, according to an aspect of some embodiments, there is provided a method for multi-perspective-based wafer analysis. The method includes:

Scanning a plurality of pages, or portions thereof, one after the other, wherein each page, or a portion thereof, is successively scanned, in each of a multiplicity of perspectives.

Analyzing scan data of a last scanned page while scanning a next page from the plurality of pages.

At least some of the pages include multiple slices of the wafer. The analysis of the scan data includes identifying defects in the scanned pages, based on an integrated analysis taking into account scan data from each of the multiplicity of perspectives.

According to some embodiments of the method, the method further includes, upon completion of the analysis of the scan data of each page from the plurality of pages, storing the analysis results of the scan data of the page and discarding the scan data of the page.

According to some embodiments of the method, the scanning is optical-based and/or electron-beam based.

According to some embodiments of the method, the multiplicity of perspectives includes two or more of at least one illumination spectrum, at least one collection spectrum, at least one illumination polarization, at least one collection polarization, an incidence angle(s), a collection angle(s), an amplitude of collected light, a phase of collected light, Fourier filtering of diffusely reflected light, and one or more foci of the illuminating light beam.

According to some embodiments of the method, the method further includes an operation of preliminary scanning of the wafer, wherein sub-regions thereof are scanned. Each sub-region is representative of a respective region of the wafer.

According to some embodiments of the method, the analysis of the scan data includes for each of a plurality of scanned areas in each scanned page, and for each of a plurality of sub-areas of the scanned area:

Computing a respective first set of sub-area values based on corresponding scan data in each of the multiplicity of perspectives.

Computing a respective reference set of sub-area values based on corresponding reference scan data in each of the multiplicity of perspectives.

Generating a respective set of difference values, based on the computed first set of sub-area values and the reference set of sub-area values.

Determining whether the sub-area includes a defect or a part of a defect, based at least on the set of difference values and a corresponding set of noise values.

According to some embodiments of the method, for each of the plurality of sub-areas the set of noise values is generated based at least on the computed set of difference values.

According to some embodiments of the method, for each of the plurality of sub-areas the set of noise values is generated based at least on scan data obtained in the preliminary scanning of the wafer.

According to some embodiments of the method, a predetermined kernel (a vector whose components are characteristic of a noise signature of a defect a sub-area is suspected of including in full or in part), and a corresponding threshold, are taken into account in determining whether the sub-area includes the defect or a part of the defect.

According to some embodiments of the method, each sub-area corresponds to a single pixel.

According to some embodiments of the method, the analysis of the scan data further includes, for each scanned area, generating a set of difference images in each of the multiplicity of perspectives. The generation of the set of difference values includes computing a corresponding set of sub-image values based on sub-images of the difference images. Each sub-image corresponds to a respective one of the sub-areas.

According to some embodiments of the method, the analysis of the scan data includes for each of the plurality of scanned areas, in each scanned page, generating a respective set of difference images obtained from scanned images of the scanned area in each of the multiplicity of perspectives and corresponding reference images. Each difference image in each set corresponds to a different perspective. Each sub-image of each difference image corresponds to a respective sub-area of the scanned area corresponding to the difference image. Sub-images corresponding to the same sub-area define a respective set of sub-images. For each sub-area, the analysis of the scan data is further characterized in that:

The computing of the first set of sub-area values of each sub-area includes computing a set of sub-image values obtained from the set of sub-images corresponding to the sub-area.

The computing of the set of noise values is based at least on the computed set of sub-image values corresponding to the sub-area and/or scan data obtained in the preliminary scanning of the wafer.

The determining of whether the sub-area includes a defect or a part of a defect, is based at least on the set of sub-image values corresponding to the sub-area, and the set of noise values.

According to some embodiments of the method, each of the sub-images consists of a single pixel.

According to some embodiments of the method, each page includes between 10 and 30 slices.

According to some embodiments of the method, the method further includes an initial sub-operation of perspective-to-perspective registration, wherein, for each of the plurality of scanned areas, the scanned images of the scanned area are registered with respect to one another.

According to some embodiments of the method, the perspective-to-perspective registration is based on grayfield channel scan data or brightfield channel scan data.

According to some embodiments of the method, the integrated analysis is performed on brightfield scan data or grayfield scan data.

According to some embodiments of the method, the sub-area values are, or include, intensity (amplitude) values and/or phase values.

According to some embodiments of the method, the sub-image values are gray level values.

According to some embodiments of the method, the method further includes determining whether a defect is a defect of interest and, optionally, when the defect is determined to be of interest, classification thereof.

According to some embodiments of the method, the set of sub-area values of each sub-area further includes data obtained from scan data pertaining to neighboring sub-areas.

According to some embodiments of the method, the computing of the set of noise values includes computing a covariance matrix.

According to some embodiments of the method, the method further includes, prior to the scanning, defining the plurality of pages.

According to an aspect of some embodiments, there is provided a non-transitory computer-readable medium. The computer-readable medium has stored therein instructions, executable by a computerized system (such as the computerized system described below), for implementing the above-described method.

According to an aspect of some embodiments, there is provided a computerized system for obtaining and analyzing multi-perspective scan data of a wafer. The system includes:
   Scanning equipment switchable between perspectives from a multiplicity of perspectives.
   A scan data analysis module configured to receive scan data obtained by the scanning equipment.
The scanning equipment is configured to scan a plurality of pages on a wafer, one page after the other, such that each page is successively scanned in each of the multiplicity of perspectives before switching to a next page until the scan of the wafer has been completed. The scan data analysis module is configured to analyze the scan data from each page, and identify defects therein, based on an integrated analysis of the scan data from each of the multiplicity of perspectives. At least some of the pages include multiple adjacent slices.

According to some embodiments of the system, the scan data analysis module is configured to analyze scan data of a last scanned page from the plurality of pages while the scanning equipment scans a next page from the plurality of pages.

According to some embodiments of the system, the scan data analysis module is configured to, upon completion of the analysis of the scan data of a first page from the plurality of pages, store the analysis results of the scan data of the first page and delete the scan data of the first page.

According to some embodiments of the system, the multiplicity of perspectives includes two or more of at least one illumination spectrum, at least one collection spectrum, at least one illumination polarization, at least one collection polarization, an incidence angle(s), a collection angle(s), an amplitude of collected light, and a phase of collected light, Fourier filtering of diffusely reflected light, and one or more foci of the illuminating light beam.

According to some embodiments of the system, the scan data analysis module is configured to, for each of a plurality of scanned areas in each scanned page, and for each of a plurality of sub-areas of the scanned area:
   Compute a respective first set of sub-area values based on corresponding scan data in each of the multiplicity of perspectives.
   Compute a respective reference set of sub-area values based on corresponding reference scan data in each of the multiplicity of perspectives.
   Generate a respective set of difference values, based on the computed first set of sub-area values and reference set of sub-area values.
   Determine whether the sub-area includes a defect or a part of a defect, based at least on the set of difference values and a corresponding set of noise values.

According to some embodiments of the system, the scan data analysis module is further configured to, for each of the plurality of sub-areas, generate the set of noise values based at least on the computed set of difference values.

According to some embodiments of the system the scan data analysis module is further configured to, for each of the plurality of sub-areas, generate the set of noise values based at least on scan data obtained in a preliminary scanning of the wafer, wherein sub-regions thereof are scanned. Each sub-region is representative of a respective region of the wafer.

According to some embodiments of the system, the scan data analysis module is further configured to, for each scanned area:
   Generate a set of difference images in each of the multiplicity of perspectives.
   Compute sets of sub-image values based on sub-images of the set of difference images, each sub-image corresponding to a respective one of the sub-areas.
   Take into account the sub-image values in generating the set of difference values.

According to some embodiments of the system, each set of sub-image values corresponds to a respective set from the sets of difference values. In particular, each difference value may equal a respective one of the sub-image values.

According to some embodiments of the system, the scan data analysis module is configured to, for each of a plurality of scanned areas in each scanned page, generate a respective set of difference images obtained from scanned images of the scanned area in each of the multiplicity of perspectives and corresponding reference images, so that each difference image in each set corresponds to a different perspective. The scan data analysis module is further configured to, for each of a plurality of sub-areas of the scanned area:
   Compute a set of sub-image values, for each of the multiplicity of perspectives, pertaining to sub-images of the difference images in the set of difference images corresponding to the scanned area.
   Determine whether the sub-area includes a defect or a part of a defect, based at least on the set of sub-image values corresponding to the sub-area, and on a corresponding set of noise values.

According to some embodiments of the system, the system further includes an analog-to-digital converter (ADC) configured to convert analog image signals, received from the scanning equipment, into digital images. The analog image signals may be of slices of pages from the plurality of pages. Each analog image signal may be of a respective perspective from the multiplicity of perspectives. The scan data analysis module includes a digital signal processor (DSP), a processing unit, and a memory functionally associated with the DSP and the processing unit. The ADC is configured to send digital images of each page, converted by the ADC, to the DSP and to the memory. For each page, the DSP is configured to perform a preliminary analysis of the digital images (received from the ADC) of the page. The preliminary analysis includes assigning scores quantifying likelihoods of pixels in the digital images being defective, thereby identifying candidate pixels in the page. The ADC is further configured to transmit a list of the candidate pixels to the processing unit. The processing unit is configured to, for each of the candidate pixels:

Request from the memory digital images of the candidate pixel in each of the multiplicity of perspectives and corresponding reference images.

Generate therefrom a set of difference values.

Perform an integrated analysis of the difference values to determine presence of (a part of) an actual defect in the candidate pixel.

The memory is further configured to delete the digital images of each page following the analysis of the digital images of the page by the processing unit.

According to some embodiments of the system, the processing unit is a graphics processing unit (GPU). The GPU is further configured such that, for each candidate pixel:

The generation of the set of difference values includes generating difference images including the candidate pixel and cropping each difference image around the candidate pixel.

The performance of the integrated analysis of the difference values includes performing an integrated analysis of the cropped images.

According to some embodiments of the system, each of the cropped images is a m×n pixel image with $3 \leq m \leq 11$ and $3 \leq n \leq 11$.

According to some embodiments of the system, each image is cropped such that the candidate pixel is located at the center of the cropped image.

According to some embodiments of the system, the memory is or includes a volatile memory (e.g. a random-access memory (RAM)).

According to an aspect of some embodiments, there is provided a scan data analysis module configured to analyze wafer scan data. The scan data analysis module includes a graphics processing unit (GPU) and a memory functionally associated therewith. The scan data analysis module is configured to:

Receive wafer scan data of a page. The scan data includes a plurality of images of areas on the page. Different images of a same area on the page correspond to respective different perspectives from a multiplicity of perspectives.

Store the scan data in the memory.

The memory has stored therein reference images of the page in each of the multiplicity of perspectives. The GPU is configured to, for each of a plurality of pixels in the page:

Request from the memory images including the pixel in each one of the multiplicity of perspectives and corresponding reference images thereof, and generate therefrom difference images including the pixel.

Perform an integrated analysis of the difference images to determine presence of (a part of) an actual defect in the pixel.

The memory is configured to delete the images of each page following the analysis of the images of the page by the GPU.

According to some embodiments of the scan data analysis module, the GPU is further configured to crop the difference images around the pixel, prior to performing the integrated analysis of the images of the pixel.

According to some embodiments of the scan data analysis module, the scan data analysis module further includes an analog-to-digital converter (ADC) and a digital signal processor (DSP). The ADC is configured to convert the received wafer scan data, which arrives as analog image signals, into digital images. Each analog image signal is of a respective perspective from the multiplicity of perspectives. The ADC is further configured to send digital images of each page to the DSP and to the memory. The DSP is configured to:

Perform a preliminary analysis of the digital images of each page, received from the ADC. The preliminary analysis includes assigning scores quantifying likelihoods of pixels in the digital images being defective, thereby identifying candidate pixels in the page.

Transmit a list of the candidate pixels to the GPU, the candidate pixels in the page constituting the plurality of pixels analyzed by the GPU.

According to some embodiments of the scan data analysis module, at least some of the pages include two or more adjacent slices.

According to some embodiments of the scan data analysis module, the memory is or includes a volatile memory.

According to an aspect of some embodiments, there is provided a non-transitory computer-readable medium. The computer-readable medium stores instructions that cause a wafer inspection system to:

Scan a plurality of pages, or portions thereof, one after the other, wherein each page, or a portion thereof, is successively scanned, in each of a multiplicity of perspectives.

Analyze scan data of a last scanned page while scanning a next page from the plurality of pages;

At least some of the pages comprise multiple slices of the wafer. The analysis of the scan data includes identifying defects in the scanned pages, based on an integrated analysis taking into account scan data from each of the multiplicity of perspectives.

Certain embodiments of the present disclosure may include some, all, or none of the above advantages. One or more other technical advantages may be readily apparent to those skilled in the art from the figures, descriptions, and claims included herein.

Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 5 presents a flowchart of sub-operations constituting one of the operations in the method of FIG. 1A, according to some embodiments;

DETAILED DESCRIPTION

Figure 1A:
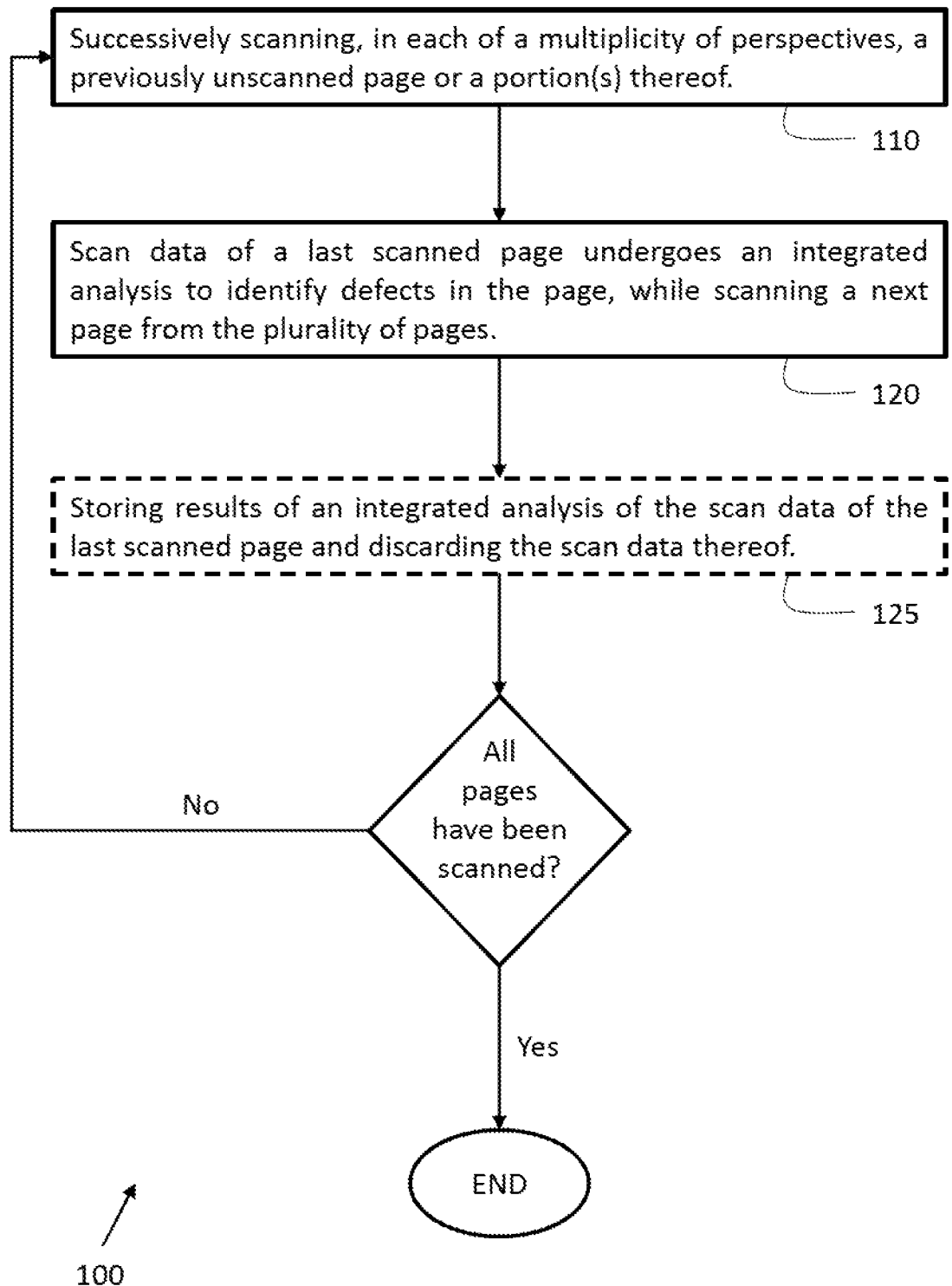
FIG. 1A presents a flowchart of a computer-implemented method for wafer analysis, wherein the wafer is scanned, one page after another, with each page scanned in a multiplicity of perspectives, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

Referring to the figures, in flowcharts, optional operations may appear within boxes delineated by a dashed line.

As used herein, according to some embodiments, the term "page" with reference to an area on a wafer, may refer to a plurality of adjacent slices.

As used herein, "multi-perspective wafer analysis" is used to refer to wafer analysis employing scan data from a multiplicity of perspectives. Different perspectives may differ from one another, for example, by polarization, collection pupil segments, phase information, focus offsets, and so on. The extra information provided by the multiplicity of perspectives (as compared to by a single perspective) may be used, in particular, to cope more efficiently with wafer noise. Scan data from several perspectives may give rise to a predictable or self-learnable pattern, which is distinguishable from wafer noise, thus, leading to improved defect detection rates.

According to an aspect of some embodiments, multi-perspective scan data is acquired sequentially, one perspective after the other. The wafer may be scanned one page after the other, with each page sequentially scanned in each of the multiplicity of perspectives. Thus, the total number of times the wafer analysis system switches between perspectives may be greatly reduced as compared to if the wafer analysis system were to switch between perspectives following the scanning of each slice. Since the overhead associated with switching between perspectives is significant, page-by-page scanning may advantageously be used to significantly increase throughput of multi-perspective wafer analysis.

According to some embodiments, the analysis of scan data is implemented using a two-layer computing architecture including a first layer and a second layer. In the first layer, a run-time preliminary analysis of scan data from different perspectives is performed. In the second layer, an integrated analysis of scan data from the different perspectives is performed, based on the results of the preliminary analysis. The first layer functions as a first funnel (filter) to identify "candidate" pixels, which are more likely to be defective. The second layer functions as a second funnel to determine whether the candidate pixels represent defects of interest (rather than nuisances). According to some embodiments, in contrast to the second layer, the first layer does not involve an integrated analysis of scan data from different perspectives, and, as such, involves comparatively lighter computations which may therefore be applied to all pixels in a page. Advantageously, the computations involved in the first layer and the second layer may be performed simultaneously, such that multi-perspective scan data from a last scanned page may undergo the integrated analysis in the second layer, while scan data from a currently scanned page undergoes the preliminary analysis in the first layer. As a further advantage, the first layer may be implemented using existent computing architecture present in some state-of-the-art wafer analysis systems, such as the Enlight wafer inspection system of Applied Materials.

Methods

According to an aspect of some embodiments, and as depicted in FIG. 1, there is provided a computer-implementable method 100 for multi-perspective-based wafer analysis. Method 100 may be implemented to analyze all of a wafer or one or more regions of the wafer. Method 100 includes:

An operation 110 wherein a previously unscanned page (from a plurality of pages of a wafer), or a portion(s) thereof, is scanned. The page, or the portion(s) thereof, is successively scanned, in each of a multiplicity of perspectives.

An operation 120 wherein scan data of a last scanned page is analyzed to identify defects in the page, while scanning a next page from the plurality of pages. The analysis of scan data of each page may be based on an integrated analysis taking into account scan data (of the page) from each of the multiplicity of perspectives.

An optional operation 125, wherein, following the analysis of the scan data of a scanned page in operation 120, the analysis results (of the scan data of the page) are stored and the scan data of the page are discarded.

Operations 110, 120, and, optionally, operation 125, are repeated until the operations have been implemented with respect to all the pages in the plurality of pages.

According to some embodiments, at least one of the pages in the plurality of pages includes a plurality of slices. According to some embodiments, each page includes a plurality of adjacent slices. (It is noted that adjacent slices may partially overlap, as known in the art of wafer analysis.) The pages in the plurality of pages may fully cover the wafer. According to some embodiments, and as depicted in FIG. 2, different pages in the plurality of pages cover distinct areas on the wafer, except for a potential partial overlap between adjacent pages due to overlap between adjacent slices.

Figure 2:
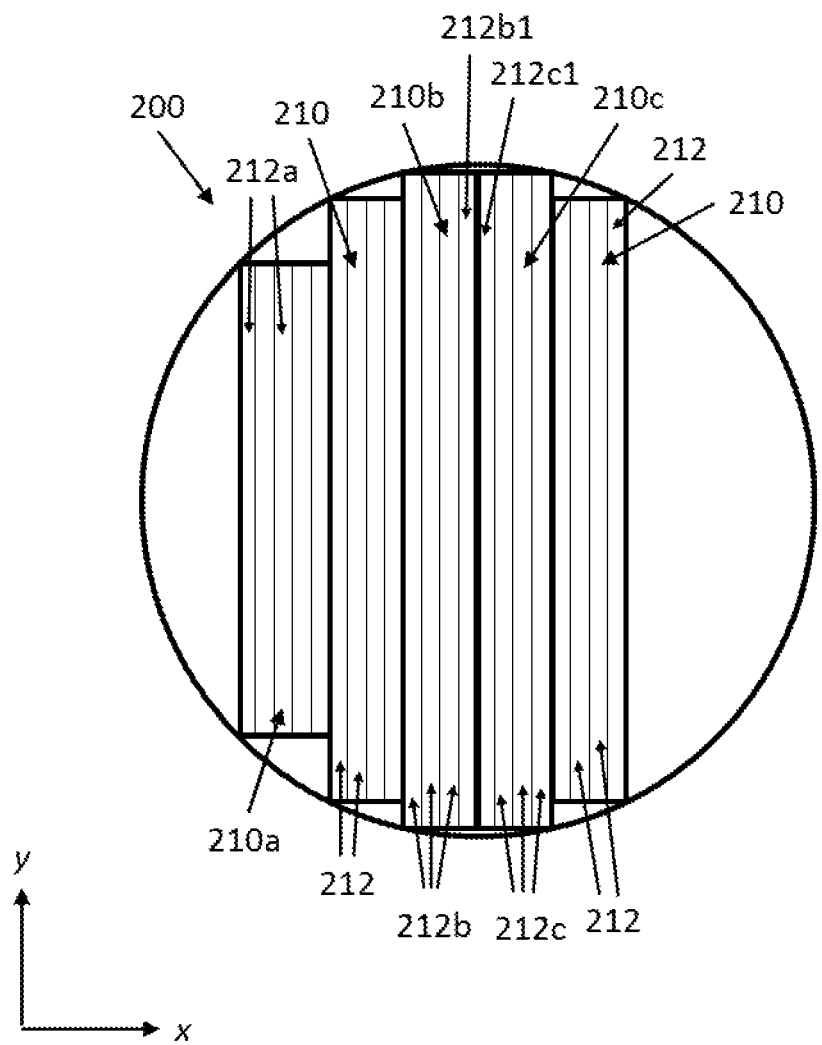
FIG. 2 schematically depicts a wafer partitioned into pages, according to some embodiments.

FIG. 2 schematically depicts a wafer 200 partitioned into pages 210 (not all of which are indicated), according to some embodiments. Each of pages 210 includes a plurality of slices 212. Also indicated is a coordinate system with perpendicular axes x and y. Axis y is parallel to slices 212. It is noted that the number of slices per page may differ from one page to another, depending on the lengths (measured along the y-axis) of the pages. Thus, a first page, may contain fewer slices than a second page, which is shorter than the first page, such as to ensure that the two pages cover areas of equal size or substantially equal size.

This last point is exemplified in FIG. 2 by a page 210a and a page 210b (both from pages 210). Page 210b is longer than page 210a. However, the size of the area defined by page 210a is substantially equal to the size of the area defined by page 210b. Accordingly, the number of slices 212b of page 210b is smaller than the number of slices 212a of page 210a. Also indicated is a page 210c adjacent to page 210b. A rightmost slice 212b1 of page 210b is adjacent to a leftmost slice 212c1 of page 210c. According to some embodiments, slices 212b1 and 212c1, and consequently pages 210b and 210c, may partially overlap. Here, the terms "right" and "left" are defined relative to a reader perusing the figures, so that the "leftwards direction" is defined as pointing in the direction of the (positive) x-axis.

Figure 1B:
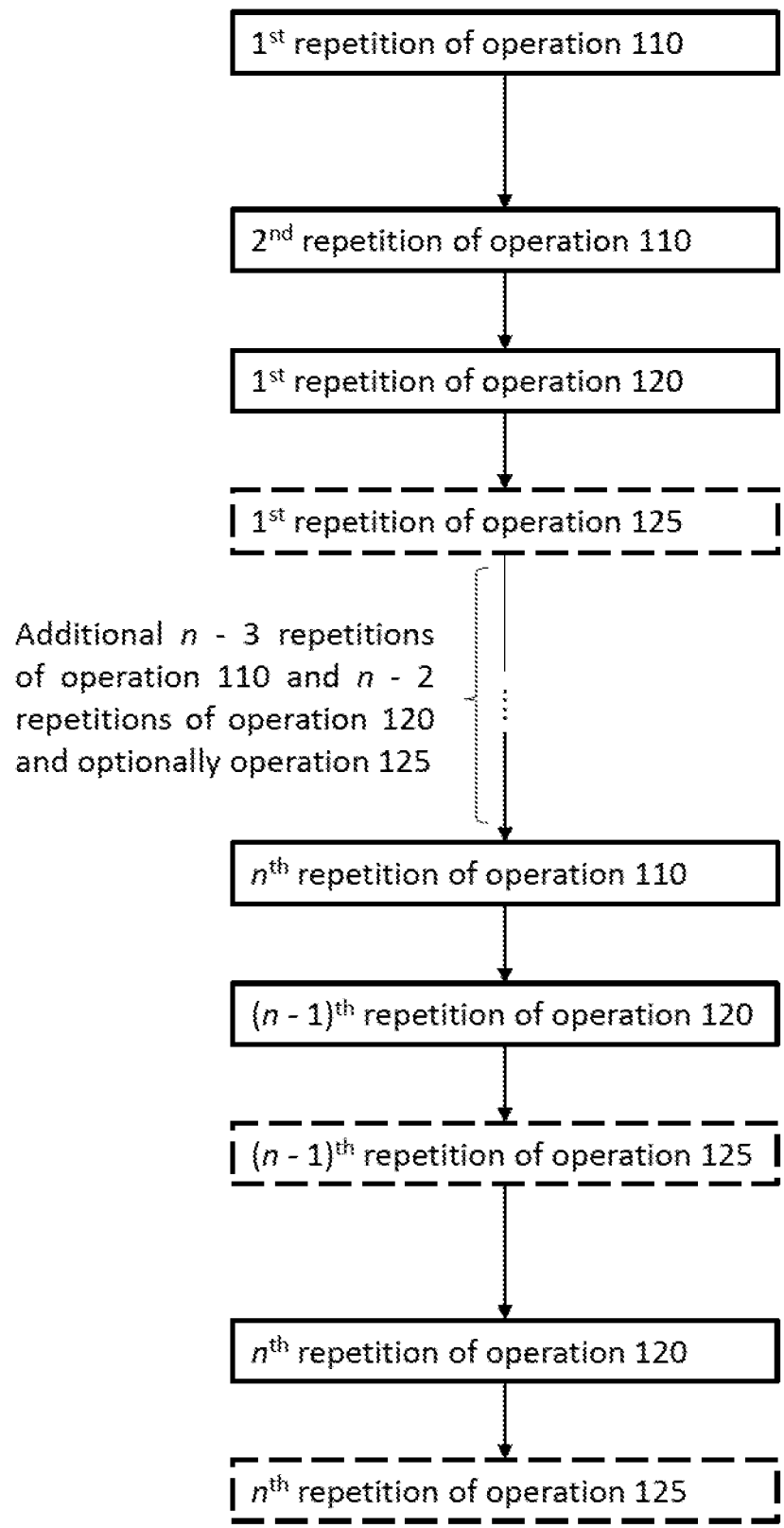
FIG. 1B is a breakdown of the flowchart of the method of FIG. 1A into sub-charts, according to some embodiments.

Making reference again to FIGS. 1A and 1B, it is noted that the execution of operation 110 and the execution of operation 120 may (partially) overlap: While a page from the plurality of pages—apart from the first page—is being scanned in operation 110, multi-perspective scan data from a last scanned page may be analyzed in operation 120, as depicted in FIG. 1B.

According to some embodiments, the multiplicity of perspectives includes two or more of at least one illumination spectrum, at least one collection spectrum, at least one illumination polarization, at least one collection polarization, one or more incidence angle(s), one or more collection angle(s), an amplitude of collected light, a phase of collected light, and one or more focus offsets of the illuminating light beam (which may be slightly out-of-focus).

A used herein, according to some embodiments, expressions such as "two or more of" and "at least two of" in reference to a list including a sub-list (which includes a plurality of items (e.g. elements or claim limitations)) and at least one item not in the sub-list, may refer to only two elements of the sub-list, one element of the sub-list and one listed element which is not in the sub-list, two elements not in the sub-list, and so on. For example, according to some embodiments, wherein the at least one illumination spectrum includes two illumination spectra, the multiplicity of perspectives may consist of, or include, the two illumination spectra.

More generally, according to some embodiments, (diffusely) reflected and/or scattered light may undergo Fourier filtering prior to being detected. The Fourier filtering may be used to increase the number of perspectives and the amount information obtainable therefrom. According to some embodiments, the multiplicity of perspectives may include slightly out-of-focus illumination.

According to some embodiments, the illumination spectrum may be narrow, for example, when the illuminating light source is a laser. According to some embodiments, the illumination spectrum may be wide, for example, when the illuminating light is from an incoherent source such as a lamp. According to some embodiments, the at least one illumination spectrum includes a plurality of illumination spectra. Each illumination spectrum in the plurality illumination spectra may be narrow—and optionally coherent (e.g. when the illuminating light is coherent laser light)—or wide.

According to some embodiments, multi-perspective scan data may be obtained from the brightfield channel (i.e. brightfield reflected light) and/or the grayfield channel (i.e. grayfield scattered light). As used herein, according to some embodiments, the term "grayfield scattered light" is used in a broad sense to refer to non-brightfield reflected light. In particular, the term "grayfield scattered light" may be used to refer also to darkfield scattered light.

It is noted that the switching between perspectives may be a timewise costly operation which may involve manipulation of optical components of the wafer analysis system, as further elaborated on below in the Systems subsection. Thus, according to some embodiments, in operation 110, the slices in each page are scanned successively one after the other, first in a first perspective (from the multiplicity of perspectives), next in a second perspective, and so on, until the slices have been scanned in each of the multiplicity of perspectives. Advantageously, the above-specified order of scanning may expedite run-time wafer analysis, as the number of times the system switches between perspectives is reduced, thereby reducing the overhead due to switching between perspectives and increasing throughput. As a non-limiting example, for fifteen slices per page and five different perspectives, the wafer analysis may be expedited by a factor of about five.

Figure 3:
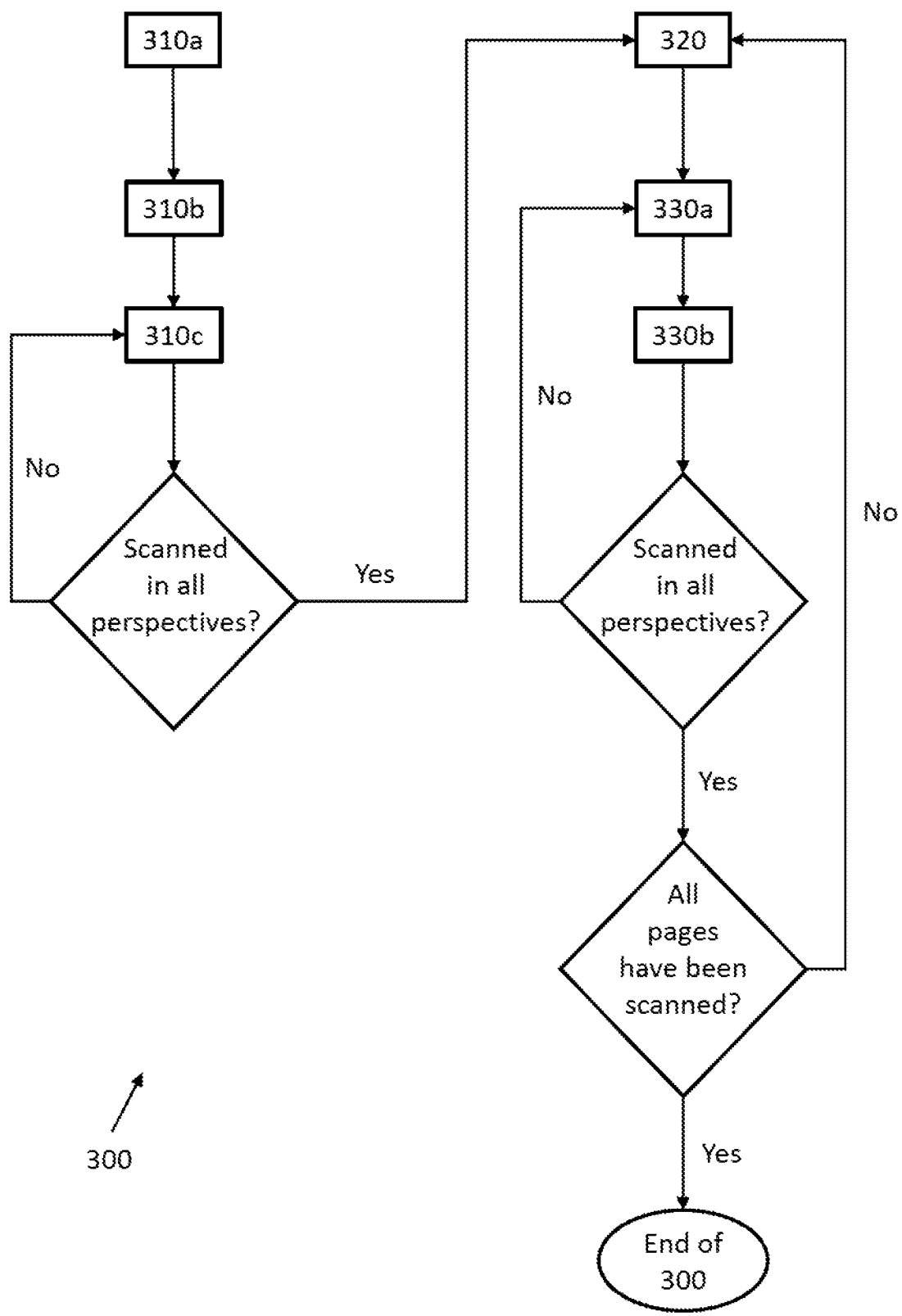
FIG. 3 presents a flowchart of sub-operations constituting one of the operations in the method of FIG. 1A, according to some embodiments.

FIG. 3 presents a flowchart 300. Flowchart 300 illustrates a specific embodiment of operation 110 of method 100. Thus, according to some embodiments and as depicted in FIG. 3, operation 110 may include:

A sub-operation 310 including:
   A sub-operation 310a wherein a first page from the plurality of pages is scanned in a first perspective from the multiplicity of perspectives, one slice after another.
   A sub-operation 310b wherein the wafer analysis system (i.e. the system implementing the scanning) switches to a next, and yet to be utilized in conjunction with the first page, perspective from the multiplicity of perspectives.
   A sub-operation 310c wherein the slices in the first page are successively scanned in the next perspective.
A sub-operation 320 wherein the wafer analysis system switches to a next, and previously unscanned, page from the plurality of pages.
A sub-operation 330 including:
   A sub-operation 330a wherein the next page from the plurality of pages is scanned in one of the perspectives from the multiplicity of perspectives, one slice after another.
   A sub-operation 330b wherein the wafer analysis system switches to a next, and yet to be utilized in conjunction with the next page, perspective from the multiplicity of perspectives
   A sub-operation 330c wherein the slices in the next page are successively scanned in the next perspective.
Repeating sub-operations 330b and 330c until the next page has been scanned in all the perspectives from the multiplicity of perspectives.
Sequentially repeating sub-operations 320 and 330 until the wafer (or one or more selected regions thereof) has been fully scanned.

According to some embodiments, when switching from a last scanned page to a next page, the perspective is not changed. Thus, the last perspective in which the last scanned page was scanned, is the first perspective in which the next page is scanned. As a non-limiting example, assuming there are three perspectives, the first page is initially scanned in the first perspective, then in the second perspective, and finally in the third perspective. The second page is then initially scanned in the third perspective, then in the first perspective, and finally in the second perspective. The third page is then initially scanned in the second perspective, then in the third perspective, and finally in the first perspective (and so on, with respect to the remaining pages). In this way, overhead, associated with switching between perspectives, is potentially further reduced.

Operation 125 is intended to free memory, as elaborated on below.

According to some embodiments, the number of slices in a page is restricted by volatile memory constraints (e.g. of the random-access memory (RAM)) of the wafer analysis system used to implement method 100. More specifically, the number of slices in a page may be selected such as that, in operation 120, before the scan data of a last scanned page are discarded in operation 125, there is sufficient space in the volatile memory to store both the scan data of the last scanned page and scan data of a currently scanned page. Thus, according to some such embodiments, the number of slices in a page may be selected such that the scan data of none of the pages consumes more than 50% of the volatile memory. According to some embodiments, wherein the wafer is fully scanned along the length thereof, the number of slices in a page may range from about 10 to about 30.

It is noted that memory constraints impose an inverse relation between the number of perspectives and the number of slices in a page. In other words, if the number of perspectives is increased, the number of slices in a page must accordingly be decreased in order to satisfy the above-described memory constraints.

According to some embodiments, method 100 may include a preliminary partitioning operation, implemented prior to (the first repetition of) operation 110, wherein the wafer is partitioned into a plurality of pages. In other words, in the partitioning operation the plurality of pages is defined. The partitioning may be such that the images (block images) of each page (obtained during a scan) consume at most 50% or about 50% of the volatile memory of the wafer analysis system.

According to some embodiments, method 100 may include a preliminary scanning operation wherein the wafer is partially scanned. The wafer may be "sampled" in the sense that a sample of sub-regions thereof is scanned. Each sub-region (e.g. die) in the sample is representative of a region of the wafer (the region may be continuous or discontinuous) characterized by a certain architecture, type of components, and so on. According to some embodiments, to reduce the computational load and expedite the wafer analysis, certain computational operations may be implemented only with respect to preliminary scan data. More specifically, scan data obtained from a sub-region representative of a region may be used also with respect to other sub-regions of the region.

Figure 4:
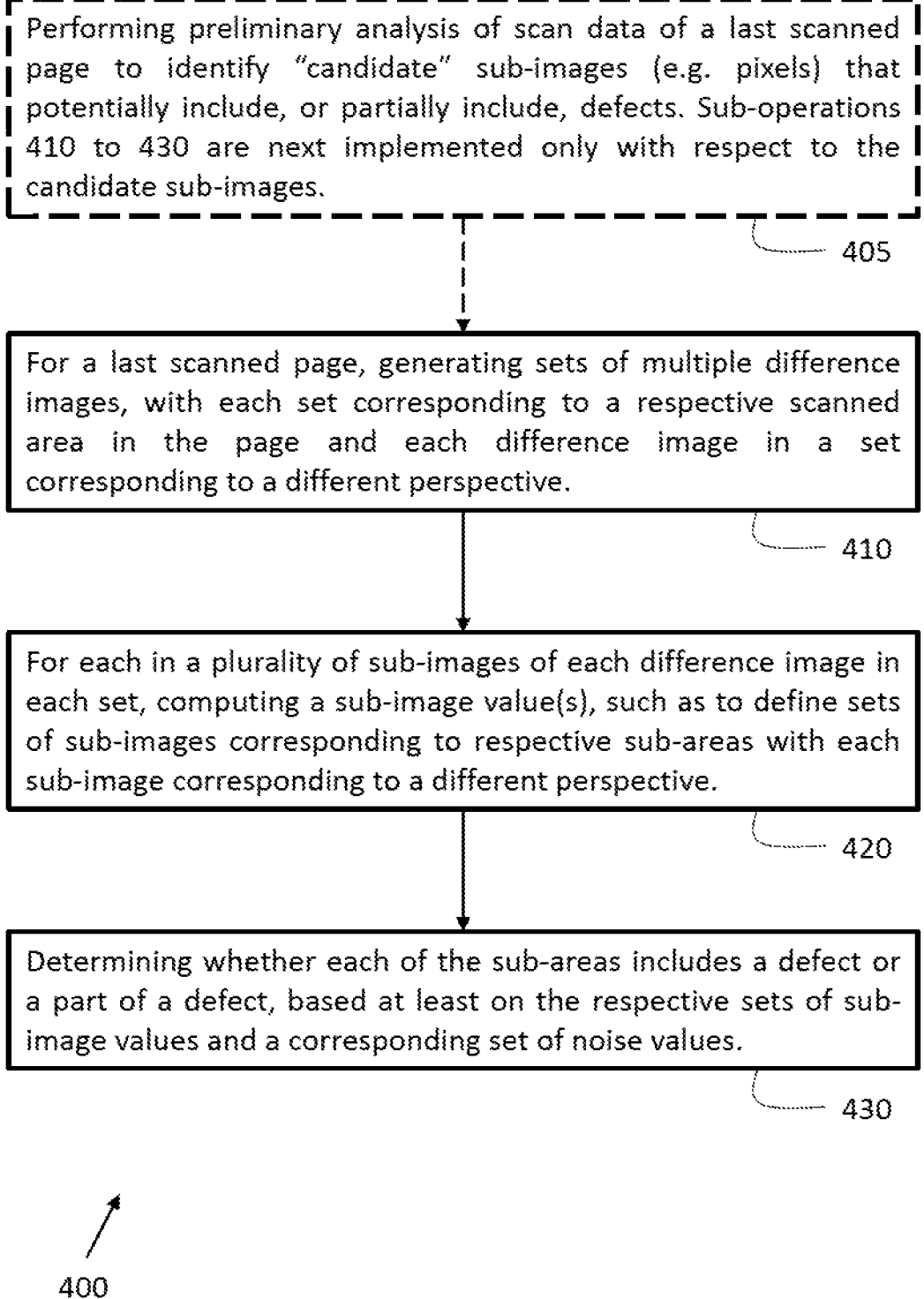
FIG. 4 presents a flowchart of sub-operations constituting one of the operations in the method of FIG. 1A, according to some embodiments.

FIG. 4 presents a flowchart 400. Flowchart 400 illustrates a specific embodiment of operation 120 of method 100. Thus, according to some embodiments and as depicted in FIG. 4, the analysis of the scan data in operation 120 may include for each page, from the plurality of pages, the following:

- A sub-operation 410 wherein sets of difference images are generated. Each set (of difference images) corresponds to a respective scanned area in the page. Each difference image in a set (from the sets of difference images) corresponds to a different perspective from the multiplicity of perspectives.
- A sub-operation 420, performed on each set of difference images, wherein for each in a plurality of sub-images of each difference image in the set, a sub-image value(s) is computed. Sub-images corresponding to a same wafer sub-area of a scanned wafer area define a respective set of sub-images with each sub-image in the set of sub-images corresponding to a different perspective (from the multiplicity of perspectives).
- A sub-operation 430, wherein each wafer sub-area is determined as including (at least part of) a defect or not, based at least on the set of sub-image values, corresponding to the wafer sub-area, and a respective (corresponding) set of noise values.

According to some embodiments, prior to sub-operation 410, images in different perspectives of a same scanned area may be registered with respect to one another. The registration may be implemented using scan data obtained from a common channel (which does not change when switching between perspectives). According to some such embodiments, the multi-perspective scan data is obtained from the brightfield channel, while the grayfield channel is used for registering the images with respect to one another. Alternatively, the multi-perspective scan data is obtained from the grayfield channel, while the brightfield channel is used for registering the images with respect to one another. (The "perspective-to-perspective" registration may be implemented in addition to standard die-to-die registration and/or cell-to-cell registration.)

Each difference image, in a given perspective (from the multiplicity of perspectives), may be obtained using at least a scanned image of the corresponding (first) wafer area and a reference image corresponding to the wafer area in the given perspective. The reference image may be a scanned image of a second wafer area (e.g. on another die or another cell), such that the first wafer area is intended to have the same design as the second wafer area.

According to some embodiments, the totality of sub-images of each difference image fully makes up the difference image. According to some embodiments, at least some of the sub-images are pixels. According to some embodiments, each of the sub-images is a pixel.

According to some embodiments, the sub-image values are, or include, intensity values. In particular, according to some embodiments, wherein the sub-images are pixels, the sub-image value(s) corresponding to a pixel is (or includes) a corresponding intensity value. According to some such embodiments, the sub-image values are gray level intensities.

According to some embodiments, the sub-image values are, or include in addition to the intensity values, phase values.

According to some embodiments, particularly embodiments wherein each of the sub-images is a pixel, operation 120 further includes a sub-operation 405, implemented prior to sub-operation 410 for each page (from the plurality of pages). In sub-operation 405, pixels in the page undergo a preliminary analysis to identify "candidate" pixels, which are potentially defective. In such embodiments, sub-operations 410 to 430 may be implemented only with respect to the candidate pixels. (Unlike when sub-operation 405 is not included, in which case sub-operations 410 to 430 may be implemented, for example, with respect to all pixels in the page). Thus, sub-operation 405 functions as a "funnel" for distinguishing pixels, which potentially represent defects of interest, from the rest of the pixels.

According to some embodiments, each page may be allocated a respective budget (quota) of candidate pixels. As non-limiting examples, the budget per page may include 1%, 0.5%, or 0.1% of the total number of pixels in the page. Each possibility corresponds to separate embodiments. According to some embodiments, each page (e.g. when the pages are of the same size) may be allocated the same budget. In sub-operation 405, each pixel in the page may be assigned a score indicating the likelihood that the pixel is defective. Next, the budget is "filled" with the pixels with the highest scores. In other words, if n "spots" are allocated, then the budget will be filled with the n pixels having the highest scores.

According to some embodiments, the preliminary analysis of sub-operation 405 may contribute to speeding up the wafer analysis. Instead of performing the computations included in sub-operations 410 to 430 with respect to all of the pixels in a page, these computations are performed only with respect to the candidate pixels. While other (extra) computations are performed, namely, as part of the preliminary analysis in sub-operation 405, these extra computations are comparatively lighter, so that overall the computational load is decreased.

According to some embodiments, the set of sub-image values of each sub-image also includes scan data pertaining to neighboring sub-images. For example, according to some embodiments wherein each sub-image is a pixel, the set of pixel values (e.g. intensity values) of each pixel may also include pixel values of neighboring pixels. As used herein, according to some embodiments, two pixels may be said to be "neighbors" when the pixels are "nearest neighbors": That is to say, the pixels are adjacent to one another in the sense of no other pixel being present there between. According to some embodiments, two pixels may be said to be "neighbors" not only when the pixels are nearest neighbors, but also when separated from one another by one pixel at most, two pixels at most, three pixels at most, five pixels at most, or even ten pixels at most. Each possibility corresponds to different embodiments.

According to some embodiments, the set of noise values—utilized in sub-operation 430 in determining whether a corresponding wafer sub-area includes a defect—may be generated based at least on the set of sub-image values computed in sub-operation 420 and associated with the wafer sub-area. According to some embodiments, particularly embodiments wherein method 100 includes a preliminary scanning operation (as described above), the generation of the set of noise values may be based at least on scan data obtained in the preliminary scanning operation.

According to some embodiments, the generation of the set of noise values includes computing a covariance matrix. According to some embodiments, the computation of the covariance matrix may be based on a corresponding set of sub-image values computed in sub-operation 420 and/or on scan data obtained in the preliminary scanning of the wafer.

The terms in the off-diagonal blocks in the covariance matrix characterize correlations between different perspectives.

Alternatively, according to some embodiments, to speed up the computations, some or all of the off-diagonal blocks are not computed. (When none of the off-diagonal blocks are computed, then the computations involved amount to computing n smaller covariance matrices. Each of then smaller covariance matrices corresponds to one of the perspectives with n being the number of perspectives.)

According to some embodiments, the determining of whether the sub-image includes a defect, in sub-operation 430, includes:

Arranging the respective set of sub-image values as a first vector.

Multiplying the first vector by the inverse of the covariance matrix to obtain a second vector.

Taking scalar product of the second vector and a third vector (e.g. a predetermined kernel) whose components include values characterizing a defect.

If the scalar product exceeds a pre-determined threshold, labeling the sub-image as including a defect.

According to some embodiments, the components of the third vector characterize the signature of a specific type of defect, the respective sub-image is suspected of including, as would appear in a difference image obtained in the absence of wafer noise. According to some embodiments, the threshold is dependent on properties of the suspected defect.

According to some embodiments, sub-operation 430 may further include classifying detected defects.

FIG. 5 presents a flowchart 500. Flowchart 500 illustrates a specific embodiment of operation 120 of method 100. Flowchart 500 generalizes flowchart 400. Thus, according to some embodiments and as depicted in FIG. 5, the analysis of the scan data in operation 120 may include for each page, from the plurality of pages, the following:

A sub-operation 510, wherein for each of a plurality of scanned areas in the page, and for each of a plurality of sub-areas of the scanned area, a respective first set of sub-area values is computed based on corresponding scan data in each of the multiplicity of perspectives.

A sub-operation 520, wherein for each of the plurality of sub-areas, a respective reference set of sub-area values is computed based on corresponding reference scan data in each of the multiplicity of perspectives.

A sub-operation 530, wherein for each of the plurality of sub-areas, a respective set of difference values is generated based on the first set of sub-area values, computed in sub-operation 520, and the respective reference set of sub-area values, computed in sub-operation 510.

A sub-operation 540, wherein for each of the plurality of sub-areas, it is determined whether the sub-area includes (at least a part of) a defect, based at least on the respective set of difference values and the respective set of noise values.

It is noted that flowchart 500 generalizes flowchart 400 in the sense that the difference values are not necessarily derived from difference images.

More generally, it is to be understood that the term "set of difference values" may refer to any set of values obtained by jointly manipulating two sets of values: a first set of values (e.g. the first set of sub-area values) and a second set of values (e.g. the reference set of sub-area values). The joint manipulation may involve any mathematical operations on the two sets of values such that the resultant set of difference values reveals variation (differences) between the two sets of values, or, more generally, distinguishes (differentiates) between the two sets of values. (The mathematical operations may or may not include subtraction.) In particular, the joint manipulation is not limited to manipulation of corresponding pairs of values. That is to say, each (difference) value in the set of difference values may result from joint manipulation of a plurality of values in the first set and a plurality of values in the second set.

According to some embodiments, the set of difference values may be obtained by subtracting one set of values (e.g. the reference set of sub-area values) from another set of values (e.g. the first set of sub-area values) on a value-by-value basis (i.e. the first value in the reference set is subtracted from the first value in the first set, and so on).

According to some embodiments, the difference values are intensity values. According to some embodiments, the difference values are, or include in addition to the intensity values, phase values.

According to some embodiments, particularly embodiments wherein each of the sub-areas corresponds to a pixel, operation 120 further includes a sub-operation 505, implemented prior to sub-operation 510 for each page (from the plurality of pages). In sub-operation 505, pixels in the page undergo a preliminary analysis to identify "candidate" pixels, which are potentially defective. In such embodiments, sub-operations 510 to 540 may be implemented only with respect to the candidate pixels. (Unlike when sub-operation 505 is not included, in which case sub-operations 510 to 540 may be implemented, for example, with respect to all pixels in the page). Thus, sub-operation 505 functions as a "funnel" for distinguishing pixels, which potentially represent defects of interest, from the rest of the pixels.

According to some embodiments, wherein operation 120 includes sub-operation 505, at least some of the computations of sub-operation 510 and, optionally, sub-operation 520, may be implemented already in sub-operation 505, in which case it is be understood that following sub-operation 505 these computations need not be repeated. For example, if all of the computations of sub-operation 510 are implemented as part of sub-operation 505, then sub-operation 520 will following sub-operation 505.

According to some embodiments, the set of difference values corresponding to each sub-area also includes scan data pertaining to neighboring sub-areas. For example, according to some embodiments wherein each sub-area corresponds to a pixel, the set of difference values corresponding to each pixel may also difference values corresponding to neighboring pixels.

According to some embodiments, the set of noise values—utilized in sub-operation 540 in determining whether a corresponding wafer sub-area includes a defect—may be generated based at least on the set of difference values computed in sub-operation 530 and associated with the wafer sub-area.

According to some embodiments, particularly embodiments wherein method 100 includes a preliminary scanning operation (as described above), the generation of the set of noise values may be based at least on scan data obtained in the preliminary scanning operation. According to some such embodiments, for each representative sub-region scanned in the preliminary scanned operation, and for each sub-area of the sub-region, a corresponding set of difference values may be computed, essentially as described above. The computed set of difference values may then be used to generate a corresponding (and representative) set of noise values. The set of noise values may be utilized in sub-operation 540—in particular, with respect to sub-areas not scanned in the preliminary scan—thereby reducing the computational load and expediting the wafer analysis (particularly in embodiments wherein the computation of the set of noise values includes computing a covariance matrix, which is computationally costly).

According to some embodiments, the determining of whether the sub-area includes a defect, in sub-operation 540, includes:

Arranging the respective set of difference values as a first vector.

Multiplying the first vector by the inverse of the covariance matrix to obtain a second vector.

Taking scalar product of the second vector and a third vector, whose components include values characterizing a defect.

If the scalar product exceeds a pre-determined threshold, labeling the pixel corresponding to the sub-area as including a defect.

According to some embodiments, the components of the third vector characterize the signature of a specific type of defect the respective sub-area is suspected of including in the absence of wafer noise. According to some embodiments, the threshold is dependent on properties of the suspected defect.

According to some embodiments, sub-operation 540 may further include classifying detected defects.

Making reference again also to FIG. 4, more generally, it is to be be understood that the term "difference image" may refer to any image obtained by combining at least two images, for example, a first image (e.g. an image of a scanned area of a wafer or an image obtained from a plurality of images of the scanned area) and a second image (e.g. a reference image derived from reference data pertaining to the scanned area). The combination of the two images may involve any manipulation of the two images resultant in at least one "difference image", which reveals variation (differences) between the two images, or, more generally, distinguishes (differentiates) between the two images. In particular, it is to be understood that the term "combination", with reference to two images, may be used in a broader sense than subtraction of one image from the other and covers other mathematical operations which may be implemented additionally or alternatively to subtraction. Further, it is to be understood that prior to combining the two images to obtain the difference image, one, or both of, two images may be individually manipulated (e.g. the first image may be registered with respect to the second image).

According to some embodiments, a difference image may be generated based on difference values.

Additionally or alternatively, according to some embodiments, deep learning tools may be applied to generate and/or improve algorithms, used in in operation 120, to recognize patterns exhibited by the multi-perspective data.

While some of the above embodiments are directed to implementations of method 100 using optical scanning, it will be understood that, according to some embodiments, method 100 may be implemented using a scanning electron microscope (SEM). According to some such embodiments, the multiplicity of perspectives includes two or more of at least one intensity of an illuminating electron beam (e-beam), at least one intensity of a collected e-beam, at least one spin of an illuminating e-beam, at least one spin of a collected e-beam, one or more incidence angle(s), and one or more collection angle(s).

Systems

Figure 6:
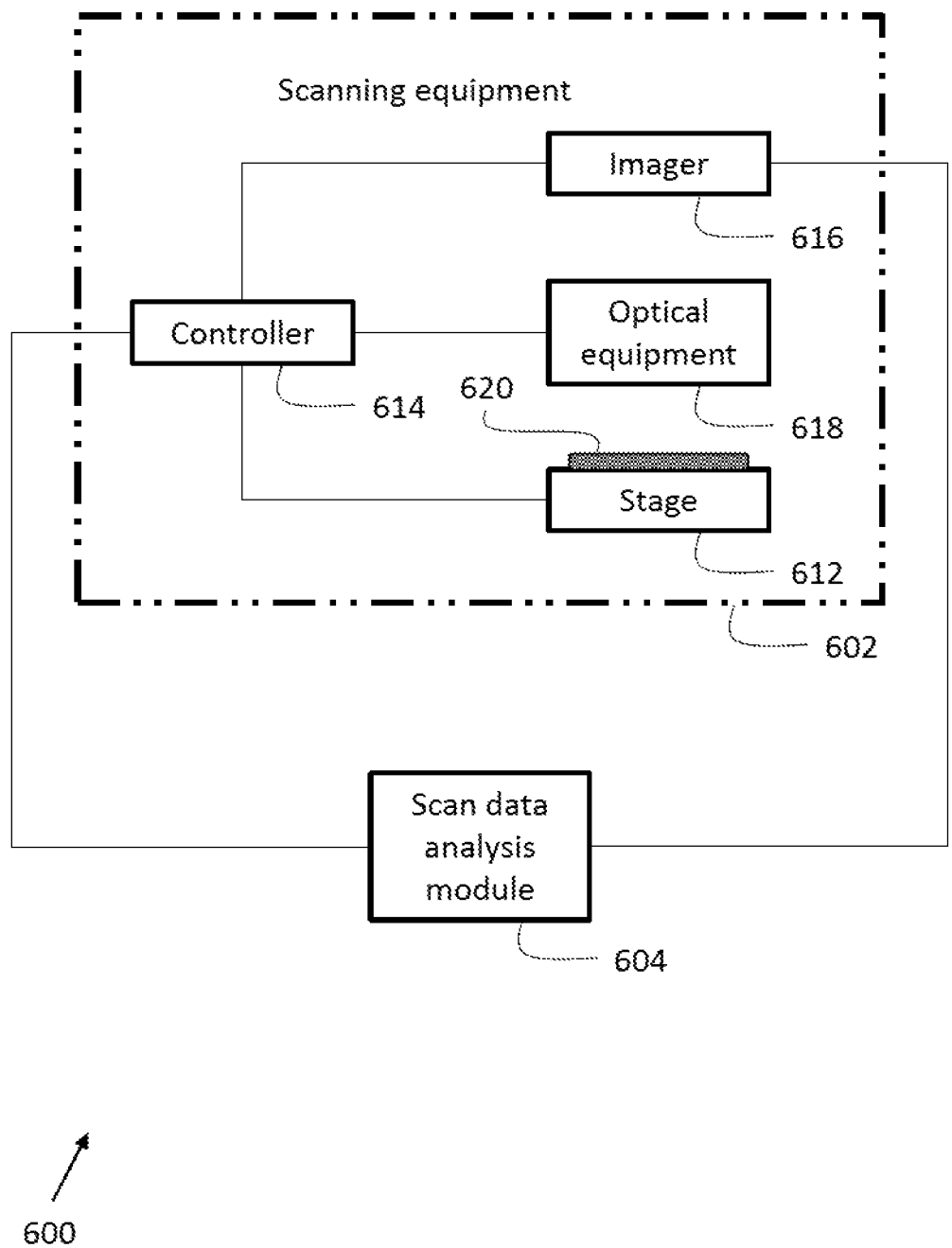
FIG. 6 presents a block diagram of a computerized system for obtaining and analyzing multi-perspective scan data of a wafer, according to some embodiments.

FIG. 6 is a block diagram of a computerized system 600 for obtaining and analyzing multi-perspective scan data of a wafer, according to some embodiments. System 600 includes scanning equipment 602 and a scan data analysis module 604. Scanning equipment 602 is configured to scan a wafer in each a multiplicity of perspectives. More specifically, scanning equipment 602 is configured to scan a wafer, one perspective (from the multiplicity of perspectives) at a time, and one page of the wafer after another, as elaborated on below. Scan data analysis module 604 is configured to (i) receive multi-perspective scan data obtained by the scanning equipment, and (ii) perform an integrated analysis of the multi-perspective scan data, as elaborated on below. As used herein, according to some embodiments, the term "multi-perspective scan data" refers to scan data obtained from scanning a wafer or one or more regions thereof in a multiplicity (two or more) perspectives, particularly, one perspective after another.

According to some embodiments, scanning equipment 602 includes a stage 612, a controller 614, an imager 616 (imaging device), and optical equipment 618. Scanning equipment 602 is delineated by a dashed-double-dotted box to indicate that components therein (e.g. stage 612 and imager 616) may be separate from one another, e.g. in the sense of not being included in a common housing.

Stage 612 is configured to have placed thereon an inspected sample, such as a wafer 620. According to some embodiments, stage 612 may be moveable, as elaborated on below. Imager 616 may include one or more light emitters (e.g. a visible and/or ultraviolet light source) configured to irradiate wafer 620. Further, imager 616 may include one or more light detectors. In particular, imager 616 may apply collection techniques including brightfield collection, grayfield collection, and the like. Optical equipment 618 may include optical filters (e.g. spatial filters, polarizing filters, Fourier filters), beam splitters (e.g. polarizing beam splitters), mirrors, lenses, prisms, and the like, configured to allow switching scanning equipment between different perspectives from the multiplicity of perspectives. For example, optical equipment 618 may include polarizing filters and/or beam splitters configured to set the polarization of emitted and/or collected light.

Controller 614 may be functionally associated with stage 612, imager 616, and optical equipment 618, as well as with scan data analysis module 604. More specifically, controller 614 is configured to control and synchronize operations and functions of the above-listed modules and components during a scan of a wafer. For example, stage 612 is configured to support an inspected sample, such as wafer 620 or wafer 200, and to mechanically translate the inspected sample along a trajectory set by controller 614, which also controls imager 616.

According to some alternative embodiments, not depicted in the figures, there is provided a computerized system for obtaining and analyzing multi-perspective scan data of a wafer. The system is similar to system 600 but differs therefrom in using an electron beam(s), rather than light, to "illuminate" (irradiate) the wafer. In other words, the system includes a scanning electron microscope.

Figure 7:
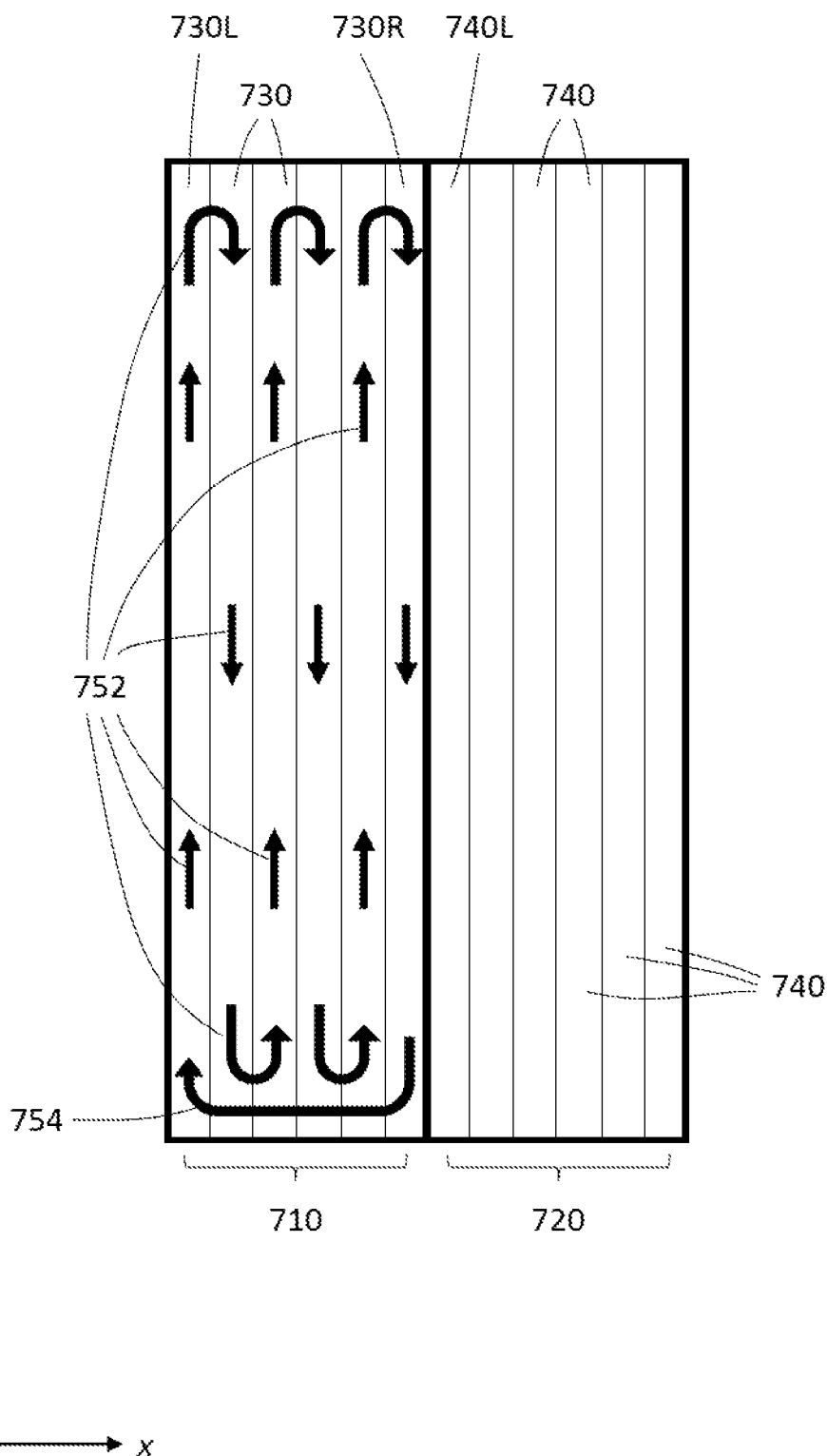
FIG. 7 schematically depicts a pair of adjacent wafer pages, according to some embodiments.

FIG. 7 schematically depicts a first page 710 and a second page 720 on wafer 620, according to some embodiments. First page 710 and second page 720 are adjacent. First page 710 includes slices 730 and second page includes slices 740. Scanning equipment 602 is configured to scan first page 710, slice after slice, in a first perspective from the multiplicity of perspectives. Following which, scanning equipment 602 is configured to switch to a second perspective from the multiplicity of perspectives, and scan first page 710, slice after slice, in the second perspective, and so on, until first page 710 has been sequentially scanned in each of the multiplicity of perspectives. Scanning equipment 602 is configured to next switch scan second page 720, slice after slice, in each of the perspective, one after the other, until second page 720 has been sequentially scanned in each of the multiplicity of perspectives. Scanning equipment 602 is configured to repeat the above operations with respect to another page (not shown), adjacent to second page 720, until wafer 620 has been fully scanned.

As an illustrative example, and as depicted by arrows 752 (not all of which are numbered), initially, first page 710 may be scanned slice after slice from left to right in the first perspective. That is, a leftmost slice 730L of slices 730 may be scanned first, for example, from bottom to top. (Here, the upwards direction is defined to be parallel to the direction defined by the (positive) y-axis.) Next, an adjacent slice (from slices 730) to leftmost slice 730L may be scanned from top to bottom, and soon, until a rightmost slice 730R of slices 730 is scanned (in the first perspective). Next, scanning equipment 602 switches to the second perspective, and scanning in the second perspective may be implemented at the same order, beginning at leftmost slice 730L (as indicated by arrow 754). That is, leftmost slice 730L is scanned (in the second perspective), followed by the slice adjacent thereto, until rightmost slice 730R is scanned. The scanning is repeated in each of the multiplicity of perspectives, until rightmost slice 730R is scanned in a last perspective from the multiplicity of perspectives. Following which, scanning of a leftmost slice 740L of second page 720 is commenced.

Alternatively, according to some embodiments, after rightmost slice 730R has been scanned in the first perspective, and scanning equipment 602 has been switched to the second perspective, the scanning of first page 710 (in the second perspective) may be implemented in reverse order to that of the first perspective. That is, in the second perspective, first page 710 may be scanned from right-to-left, such that rightmost slice 730R is scanned first and leftmost slice 730L is scanned last. Following which, first page 710 may be scanned from left-to-right in the third perspective, and so on.

According to some embodiments, scanning equipment 602 may be configured such that second page 720 is first scanned in the "last perspective", i.e. in which first page 710 was last scanned, and only then in the first perspective, and so on. Alternatively, according to some embodiments, scanning equipment 602 may be configured such that prior to commencing the scanning of second page 720, scanning equipment 602 switches back to the first perspective (so that second page 720 as well is first scanned in the first perspective).

Scan data analysis module 604 includes computer hardware (one or more processors, such as image and/or graphics processor units, and volatile as well as non-volatile memory components). The computer hardware is configured to analyze multi-perspective scan data received from imager 616, of a page on wafer 620, for presence of defects, essentially as described above in the Methods subsection. For each page on the wafer, scan data analysis module 604 may be configured to:

Generate sets of difference values, in each of the multiplicity of perspectives, based on the scan data of a scanned area received from imager 616 and corresponding reference images, which may be stored in the memory component(s). Each difference value corresponds to a sub-area of the scanned area, essentially as described above in the description of sub-operations 510, 520, and 530 of flowchart 500.

For each sub-area, determine whether the sub-area includes (at least a part of) a defect based at least on the corresponding set of difference values and the respective set of noise values, essentially as described above in the description of sub-operation 540 of flowchart 500.

According to some embodiments, scan data analysis module 604 may be configured to, for each set of difference values, and, based at least thereon, generate the corresponding set of noise values, essentially as described above in the description of flowchart 500. According to some embodiments, the generation of the set of noise values may be based at least on scan data obtained in a preliminary scan of the wafer, wherein representative sub-regions of the wafer are scanned.

According to some embodiments, the determination of whether the sub-area includes a defect, may be implemented taking into account the type of defect the sub-area may be suspected of including. In particular, the determination may involve computation of a covariance matrix, and may further include computations involving a predetermined kernel, which characterizes the noise signature of a suspected type of defect, and a corresponding threshold.

According to some such embodiments, for each page on the wafer, scan data analysis module 604 may be configured to:

Generate sets of difference images, in each of the multiplicity of perspectives, from the scan data received from imager 616 and corresponding reference images which may be stored in the memory component(s). The generation of the sets of difference images may be performed essentially as described above in the description of sub-operation 410 of flowchart 400.

For each in a plurality of sub-images of each difference image in each set, compute a sub-image value(s), such as an intensity value, wherein sub-images corresponding to a same sub-area of the wafer define a respective set of sub-images. The computation may be performed essentially as described above in the description of sub-operation 420 of flowchart 400.

For each sub-area, determine whether the sub-area includes (at least a part of) a defect based at least on the corresponding set of sub-image values and a respective set of noise values, essentially as described above in the description of sub-operation 430 of flowchart 400.

According to some embodiments, scan data analysis module 604 may be configured to analyze scan data from a last scanned page on wafer 620, while scanning equipment 602 scans a next page on wafer 620. In particular, the next page may be adjacent to the last scanned page. According to some embodiments, scan data analysis module 604 may be configured such that once the analysis of scan data from a last scanned page is completed, the analysis results are saved and the scan data are deleted.

According to some embodiments, scan data analysis module 604 may be configured to, for each set of sub-image values, and, based at least thereon, generate the corresponding set of noise values, essentially as described above in the description of flowchart 500. According to some embodiments, the generation of the set of noise values may be based at least on scan data obtained in a preliminary scan of the wafer, wherein representative sub-regions of the wafer are scanned.

Figure 8:
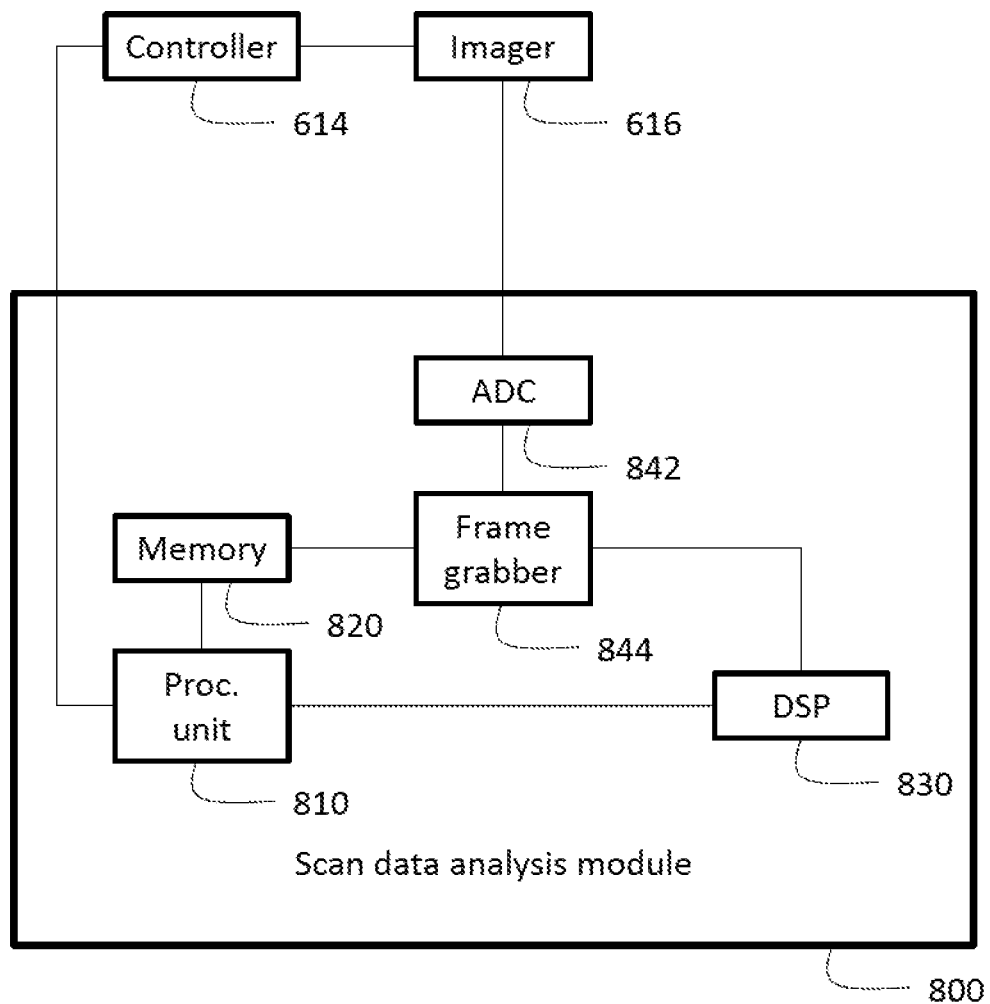
FIG. 8 presents a block diagram of a scan data analysis module, according to some embodiments.

FIG. 8 presents a block diagram of a scan data analysis module 800, according to some embodiments. According to some embodiments and as depicted in FIG. 8, scan data analysis module 800 may be a specific embodiment of scan data analysis module 604.

Scan data analysis module 800 includes a processing unit 810, a memory 820 (e.g. including a random-access memory (RAM)), and a digital signal processor 830 (DSP). According to some embodiments, processing unit 810 is a graphics processing unit (GPU). Scan data analysis module 800 may further include an analog-to-digital (signal) converter 842 (ADC) and a frame grabber 844. Processing unit 810 is functionally associated with memory 820 and DSP 830. Processing unit 810 may be further associated with a controller of a scanning equipment with which scan data analysis module 800 is associated (i.e. a scanning equipment from which scan data analysis module 800 receives scan data) or is configured to be associated, such as controller 614 of scanning equipment 602.

ADC 842 is configured to receive analog image signals from an imager, such as imager 616 of scanning equipment 602. Each analog image signal may correspond to a different perspective from a multiplicity of perspectives, as described above in the Methods subsection. ADC 842 is further configured to convert the analog image signals into digital image signals and to transmit the digital image signals to frame grabber 844. Frame grabber 844 is configured to obtain from the digital image signals, received from DSP 830, digital images (block images) of scanned areas on a page of the scanned wafer (e.g. wafer 620). Each digital image is in one of the multiplicity of perspectives. Frame grabber 844 is further configured to transmit the digital images to memory 820 and to DSP 830.

DSP 830 is configured to perform a preliminary analysis of the digital images received from frame grabber 844. The preliminary analysis includes registration of the digital images, and, in particular, identification of "candidate" pixels in each page, essentially as described in the description of sub-operation 405 of operation 120 of method 100. Thus, DSP 830 functions as a first funnel for picking out candidate pixels. DSP 830 is further configured to send a list of the candidate pixels to processing unit 810.

Processing unit 810 is configured to, on receipt of the list of candidate pixels, to request from memory 820 (digital) images including the candidate pixels in each of the multiplicity of perspectives, as well as corresponding reference images, and to generate therefrom sets of difference images. Each set of difference images associated with a respective candidate pixel, includes difference images thereof in each of the multiplicity of perspectives. According to some embodiments, processing unit 810 is further configured to:

- Crop the difference images in each set of difference images to obtain corresponding set of cropped images. Each difference image may be cropped such that the candidate pixel is positioned at the center of the resultant cropped image. According to some embodiments, the cropped images may be m×n pixel images with 3≤m≤11 and 3≤n≤11.
- Compute pixel values (such as intensity values) associated with each of the candidate pixels and surrounding pixels in each set of cropped images.
- Perform an integrated analysis of the cropped images in each set of cropped images to determine presence of an actual (part of a) defect in the candidate pixel, essentially as described in the description of sub-operation 430 of flowchart 400.

Thus, processing unit 810 is seen to function as a second funnel, which distinguishes between nuisances and defects of interest in the candidate pixels.

Processing unit 810 may be configured to analyze scan data from a last scanned page on a wafer, while a next page on the wafer is being scanned. In contrast, the preliminary analysis performed by DSP 830 may be in real-time or substantially in real-time. More specifically, upon receiving a digital image from frame grabber 844, DSP 830 may proceed to assign score to the pixels in the image. It is noted that unlike the analysis performed by processing unit 810, DSP 830 does not perform an integrated analysis. That is, each digital image in a given perspective is analyzed independently of other digital images (in different perspectives) corresponding to the same scanned area. The score assigned by DSP 830 to each "pixel" on a page on the wafer, may be the sum of the scores assigned to the corresponding pixels in each of the digital images (each in a different perspective) corresponding to the scanned area.

According to some embodiments, the score may be based only on some of the perspectives from the multiplicity of perspectives, for example, the first perspective, or the first two perspectives. The list of candidate pixels is thus concluded prior to completing the scanning of the corresponding page. According to some such embodiments, this may allow deleting some of the scan data (that is, scanned images which do not include any of the candidate pixels), stored in memory 820, prior to the completion of the scanning of the page to which the scan data pertains. In turn, this may allow for including more slices in page, thereby further reducing the overhead due to switching between perspectives.

According to some embodiments, DSP 830 may be configured to perform standard (e.g. die-to-die and/or cell-to-cell) registration of images received from frame grabber 844. Processing unit 810 may be further configured to perform perspective-to-perspective registration of the cropped images in each set of cropped images.

More generally, according to some embodiments, processing unit 810 may be configured to compute a respective set of difference values for each candidate pixel, which are not necessarily derived from difference images, essentially as described above in the description of flowchart 500 and the corresponding part of the description of scan data analysis module 604.

As used herein, according to some embodiments, an area (or sub-area) on a wafer may be said to include (contain) a defect even when including only a part of the defect (so that the rest of the defect is included in neighboring areas). Similarly, according to some embodiments, a group of pixels in an image may be said to include a defect (depict) even when including only a part of the defect. In particular, according to some embodiments, a single pixel may be said to include a defect in the sense of including a part of a defect (an actual defect typically extending over a group of pixels). According to some embodiments, a pixel may be said to be "defective" in the sense of including a defect.

While some of the above description has focused mainly on optical-based scanning, it will be understood that the scope of the disclosure also covers non-optical based scanning systems and, in particular, charged-particle beam based scanning, for example, using a SEM.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods according to some embodiments may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A method for multi-perspective-based wafer analysis, the method comprising:
    scanning a plurality of pages, or portions thereof, one after the other, wherein each page, or a portion thereof, is successively scanned, in each of a multiplicity of perspectives; and
    analyzing scan data of a last scanned page while scanning a next page from the plurality of pages;
wherein at least some of the pages comprise multiple slices of a wafer; and
wherein the analysis of the scan data comprises identifying defects in the scanned pages, based on an integrated analysis taking into account scan data from each of the multiplicity of perspectives.

2. The method of claim 1, further comprising, upon completion of the analysis of the scan data of each page from the plurality of pages, storing the analysis results of the scan data of the page and discarding the scan data of the page.

3. The method of claim 1, wherein the multiplicity of perspectives comprises two or more of at least one illumination spectrum, at least one collection spectrum, at least one illumination polarization, at least one collection polarization, an incidence angle(s), a collection angle(s), an amplitude of collected light, a phase of collected light, Fourier filtering of diffusely reflected light, and one or more foci of an illuminating light beam.

4. The method of claim 1, wherein the analysis of the scan data comprises for each of a plurality of scanned areas in each scanned page, and for each of a plurality of sub-areas of the scanned area:
    computing a respective first set of sub-area values based on corresponding scan data in each of the multiplicity of perspectives;
    computing a respective reference set of sub-area values based on corresponding reference scan data in each of the multiplicity of perspectives;
    generating a respective set of difference values, based on the computed first set of sub-area values and reference set of sub-area values; and
    determining whether the sub-area includes a defect or a part of a defect, based at least on the set of difference values and a corresponding set of noise values.

5. The method of claim 4, wherein, for each of the plurality of sub-areas, the set of noise values is generated based at least on the computed set of difference values and/or scan data obtained in a preliminary scanning of the wafer wherein sub-regions thereof are scanned, each sub-region being representative of a respective region of the wafer.

6. The method of claim 4, wherein the analysis of the scan data further comprises, for each scanned area, generating a set of difference images in each of the multiplicity of perspectives, and wherein the generation of the set of difference values comprises computing a corresponding set of sub-image values based on sub-images of the difference images, each sub-image corresponding to a respective one of the sub-areas.

7. The method of claim 6, wherein at least one of the sub-images consists of a single pixel.

8. A computerized system for obtaining and analyzing multi-perspective scan data of a wafer, the system comprising:
    scanning equipment switchable between perspectives from a multiplicity of perspectives; and
    a scan data analysis module configured to receive scan data obtained by the scanning equipment;
wherein the scanning equipment is configured to scan a plurality of pages on a wafer, one page after the other, at least some of the pages comprising multiple adjacent slices, such that each page is successively scanned in each of the multiplicity of perspectives, before switching to a next page, until the scan of the wafer has been completed; and
wherein the scan data analysis module is configured to analyze the scan data from each page, and identify defects therein, based on an integrated analysis of the scan data from each of the multiplicity of perspectives.

9. The system of claim 8, wherein the scan data analysis module is configured to analyze scan data of a last scanned page from the plurality of pages while the scanning equipment scans a next page from the plurality of pages.

10. The system of claim 8, wherein the scan data analysis module is configured to, upon completion of the analysis of the scan data of a first page from the plurality of pages, store the analysis results of the scan data of the first page and delete the scan data of the first page.

11. The system of claim 8, wherein the multiplicity of perspectives comprises two or more of at least one illumination spectrum, at least one collection spectrum, at least one illumination polarization, at least one collection polarization, an incidence angle(s), a collection angle(s), an amplitude of collected light, and a phase of collected light, Fourier filtering of diffusely reflected light, and one or more foci of the illuminating light beam.

12. The system of claim 8, wherein the scan data analysis module is configured to, for each of a plurality of scanned areas in each scanned page, and for each of a plurality of sub-areas of the scanned area:
    compute a respective first set of sub-area values based on corresponding scan data in each of the multiplicity of perspectives;
    compute a respective reference set of sub-area values based on corresponding reference scan data in each of the multiplicity of perspectives;
    generate a respective set of difference values, based on the computed first set of sub-area values and reference set of sub-area values;
    determine whether the sub-area includes a defect or a part of a defect, based at least on the set of difference values and a corresponding set of noise values.

13. The system of claim 12, further comprising an analog-to-digital converter (ADC) configured to convert analog image signals, received from the scanning equipment, into digital images, wherein the analog image signals are of slices of pages from the plurality of pages, each analog image signal being of a respective perspective from the multiplicity of perspectives;
   wherein the scan data analysis module comprises a digital signal processor (DSP), a graphics processing unit (GPU), and a memory functionally associated with the DSP and the GPU;
   wherein the ADC is configured to send digital images of each page, converted by the ADC, to the DSP and to the memory;
   wherein DSP is configured to (i) perform a preliminary analysis of the digital images of the page, received from the ADC, the preliminary analysis comprising assigning scores quantifying likelihoods of pixels in the digital images being defective, thereby identifying candidate pixels in the page, and (ii) transmit a list of the candidate pixels to the GPU;
   wherein the GPU is configured to, for each of the candidate pixels, (i) request from the memory images of the candidate pixel in each of the multiplicity of perspectives and corresponding reference images, (ii) generate difference images, (iii) crop each difference image around the candidate pixel, and (iii) perform an integrated analysis of the cropped images to determine presence of an actual defect in the candidate pixel; and
   wherein the memory is further configured to delete the digital images of each page following the analysis of the digital images of the page by the GPU.

14. The system of claim 13, wherein at least one of the cropped images consists of a single pixel.

15. A non-transitory computer-readable medium storing instructions that cause a wafer analysis system to:
   scan a plurality of pages, or portions thereof, one after the other, wherein each page, or a portion thereof, is successively scanned, in each of a multiplicity of perspectives; and
   analyze scan data of a last scanned page while scanning a next page from the plurality of pages;
wherein at least some of the pages comprise multiple slices of the wafer; and
wherein the analysis of the scan data comprises identifying defects in the scanned pages, based on an integrated analysis taking into account scan data from each of the multiplicity of perspectives.

* * * * *